April 11, 1950     H. S. CHURCH     2,503,934
HOSE CONSTRUCTION
Filed Feb. 25, 1946
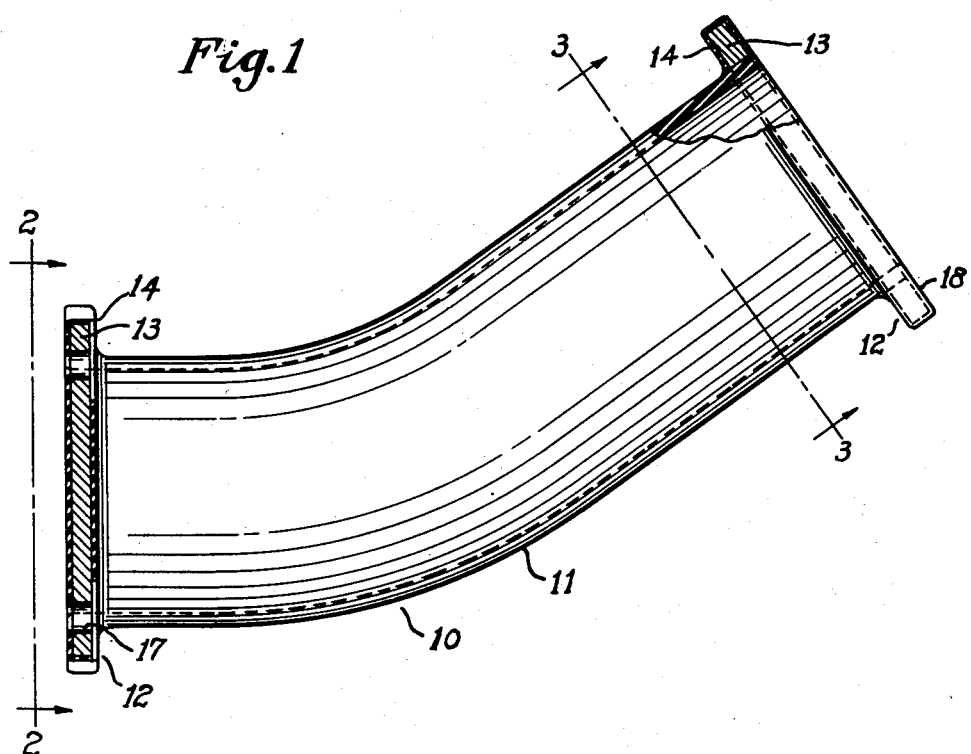
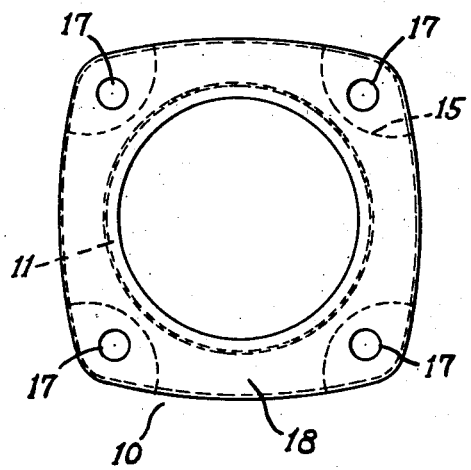
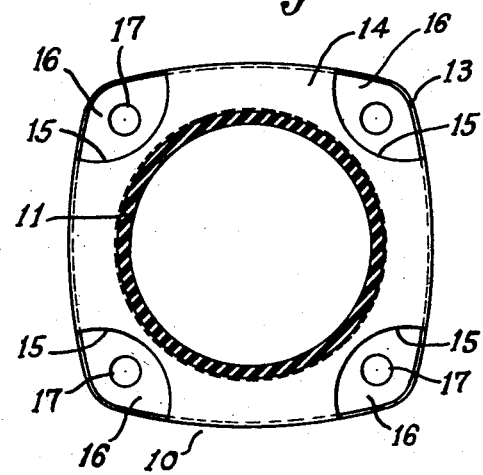
INVENTOR.
*Herman S. Church*
BY
*Frease and Bishop*
ATTORNEYS Patented Apr. 11, 1950

2,503,934

UNITED STATES PATENT OFFICE 2,503,934

HOSE CONSTRUCTION

Herman S. Church, Cuyahoga Falls, Ohio, assignor to The Monarch Rubber Company, Hartville, Ohio, a corporation of Ohio Application February 25, 1946, Serial No. 649,949

1 Claim. (Cl. 138—49)

The invention relates to hose of natural rubber or synthetic rubber, or rubber composition and the like particularly adapted for connection between the radiator and engine cooling chambers in the cooling system of an internal combustion engine, or between the air cleaner and carburetor of an internal combustion engine.

As usually constructed, the connections for such a hose in an internal combustion engine have been made by telescoping each end of the hose over a sleeve and by engirdling the hose over each sleeve with a screw clamp, and such usual connections are sources of constant trouble and failure and leakage in internal combustion engines for automobiles, trucks, and the like.

The objects of the present invention include the provision of improved hose construction, particularly adapted for use between the radiator and engine cooling chambers in the cooling system of an internal combustion engine, or between the air cleaner and carburetor of an internal combustion engine, the hose construction being adapted to be made of molded natural rubber, synthetic rubber, rubber composition, or similar material, and which includes at each end of a length of molded hose improved means for connecting the hose end directly to the radiator, engine, air cleaner, carburetor, or other equipment.

Further objects of the present invention include the provision of improved hose construction including a hose portion of molded natural rubber, synthetic rubber, rubber composition, or similar material combined by vulcanizing with improved connecting means at each end of the hose, and which is adapted for relatively easy and economical manufacture, installation, and maintenance.

The foregoing and other objects are attained by the hose construction, parts, combinations, and sub-combinations, which comprise the present invention, the nature of which is set forth in the following general statement, and preferred embodiments of which together with their mode of use, are set forth by way of example in the following description, and which are particularly and distinctly pointed out and set forth in the appended claim forming part hereof.

The nature of the improved hose construction of the present invention may be stated in general terms as including a longitudinally extending hose or tube of molded natural rubber, synthetic rubber, rubber composition, or similar flexible and resilient material, the tube having at each end an outwardly extending annular hollow shell flange consisting of a continuation of the molded material of the tube and having embedded and vulcanized therein a metal flange ring, the composite rubber and metal flange ring having a plurality of apertures formed therein for providing connection by screw or bolt means with another flange or faced area on the part with which the hose is connected.

By way of example, embodiments of the improved hose construction and the parts thereof are illustrated in the accompanying drawing forming part hereof in which Figure 1 is a side elevational view with portions in section of one embodiment of the improved hose construction;

Fig. 2 is an end elevation thereof looking in the direction of the arrows 2—2; and Fig. 3 is a transverse section thereof as on line 3—3, Fig. 1.

Similar numerals refer to similar parts throughout the views of the drawing.

The improved hose construction indicated generally by 10 is particularly adapted for use as a connection between the air cleaner and carburetor of an internal combustion engine, not shown, and the improved hose construction 10 includes a longitudinally extending tube 11 which is longitudinally curved, and which is molded of natural rubber, synthetic rubber, rubber composition, or similar material, which is flexible, resilient, and oil resistant.

At each end of the tube 11 the molded material thereof extends continuously in an outer annular hollow shell flange 12 in which is embedded and preferably vulcanized a metal preferably rigid flange ring 13 having opposite flat faces.

The inner wall 14 of the molded shell flange 12 is provided with a plurality of cut-outs 15 each exposing an inner face area 16 of the metal flange ring 13, and a circular hole or aperture 17 extends between each cut-out 15 through the metal flange 13 and the outer molded wall 18 of the shell flange 12. Each aperture 17 is surrounded by one of the face areas 16 of the metal flange 13 which serves as a clamping seat against which a cap screw head or bolt head may be applied in effecting connection of the composite flange formed by the annular shell flange 12 and the metal flange 13 embedded therein, with another flange or faced part, after the connection being made the outer wall 18 of the shell flange 12 acting as a gasket.

By the use of the foregoing improved hose construction with composite connecting end flanges, direct flat gasket sealed flange connections may be made as distinguished from telescoping sleeves and engirdling clamps; and with the present improved construction all difficulties with failure and leakage at the connection are avoided, in such installations as a hose connection between an air cleaner and the carburetor of an internal combustion engine, or a hose connection between the radiator and engine cooling chambers in the cooling system of an internal combustion engine.

The embodiments of the present invention illustrated and described herein are by way of example, and the scope of the present invention is not limited to the same or to the particular details thereof but is commensurate with any and all novel subject matter contained herein which may at any time properly under the patent laws be set forth in the claim hereof or originating herein, and the elements of any such claim are intended to include their functional or structural equivalents.

I claim:

In hose construction and the like, a longitudinally extending tube of molded flexible and resilient material, and a composite flange on one end of the tube, the composite flange including an annular hollow shell flange of molded material continuous with the molded material of the tube, and a rigid flange ring embedded in the hollow shell flange, the shell flange having an inner wall with cut-out portions formed therein exposing inner face areas of the rigid flange ring, and the shell flange including an outer gasket wall, and there being apertures extending through the rigid flange ring and the shell flange outer gasket wall, each aperture being surrounded by one of the exposed inner face areas of the rigid flange.

HERMAN S. CHURCH.

REFERENCES CITED

The following references are of record in the file of this patent:

UNITED STATES PATENTS

| Number | Name | Date |
|---|---|---|
| 2,146,218 | Kimmich et al. | Feb. 7, 1939 |
| 2,241,355 | Maclachlan | May 6, 1941 |